US006511040B2

(12) United States Patent
Gardner

(10) Patent No.: US 6,511,040 B2
(45) Date of Patent: Jan. 28, 2003

(54) PNEUMATIC ACTUATOR

(76) Inventor: Murray J. Gardner, 1273 Spoose Road, Unit 4, Oakville, Ontario (CA), L6L 5T5

( * ) Notice: Subject to any disclaimer, the term of this patent is extended or adjusted under 35 U.S.C. 154(b) by 0 days.

(21) Appl. No.: 09/948,678

(22) Filed: Sep. 10, 2001

(65) Prior Publication Data

US 2002/0011578 A1 Jan. 31, 2002

Related U.S. Application Data

(63) Continuation-in-part of application No. 09/597,268, filed on Jun. 20, 2000, now abandoned, which is a continuation of application No. PCT/CA00/00373, filed on Apr. 7, 2000, which is a continuation of application No. 09/287,261, filed on Apr. 7, 1999, which is a continuation of application No. PCT/CA97/00736, filed on Oct. 7, 1997.

(51) Int. Cl.[7] .......................... F01C 9/00; F16K 31/122
(52) U.S. Cl. .......................... 251/59; 251/61.4; 92/120; 92/121; 92/124
(58) Field of Search .................... 251/59, 61.4; 92/120, 92/121, 124

(56) References Cited

U.S. PATENT DOCUMENTS

| | | | | |
|---|---|---|---|---|
| 3,051,143 A | * 8/1962 | Nee | | 92/121 |
| 3,554,096 A | * 1/1971 | DeJager | | 92/125 |
| 3,620,132 A | * 11/1971 | Nitkiewicz | | 92/2 |
| 3,688,645 A | * 9/1972 | Reaves | | 251/59 |
| 4,628,797 A | * 12/1986 | Kendall | | 92/120 |
| 5,007,330 A | * 4/1991 | Scobie et al. | | 92/120 |
| 5,044,257 A | * 9/1991 | Scobie | | 92/120 |
| 5,386,761 A | * 2/1995 | Holtgraver | | 251/59 |

FOREIGN PATENT DOCUMENTS

| | | |
|---|---|---|
| DE | 1295381 | * 5/1969 |
| DE | 2061643 | * 7/1971 |
| GB | 1270941 | * 4/1972 |
| GB | 1284293 | * 8/1972 |
| GB | 1363609 | * 8/1974 |
| GB | 1552539 | * 9/1979 |
| JP | 52004974 | * 1/1977 |
| WO | WO-91/09208 | * 6/1991 |
| WO | WO-91/14852 | * 10/1991 |
| WO | WO-94/02710 | * 2/1994 |
| WO | WO- 99/18357 | * 4/1999 |

OTHER PUBLICATIONS

Kinetron Rotary Actuators Catalogue #KF–84, Apr. 1997.*
Xomox Matryz Vane Type Actuators Catalogue #PN329738, Mar. 1994.*
Neles–Jamesbury Bulletin No. A105–1.*
Neles–Jamesbury Bulletin No. A106–1.*

* cited by examiner

*Primary Examiner*—Henry C. Yuen
*Assistant Examiner*—John Bastianelli
(74) *Attorney, Agent, or Firm*—Gowling Lafleur Henderson LLP

(57) ABSTRACT

Disclosed is a pneumatic actuator which includes a housing comprised of two halves and having at least two passages defined therethrough, including a "loop" groove defined in an inner peripheral wall of the housing into which a seal member is inserted. A rotary piston is rotatably received in the housing. The piston has a top and a bottom with an intermediate wall connected there between, and an actuating shaft extending through the housing, which is rotated by movement of the rotary piston. The seal member extends into the housing and is in contact with the top and bottom of the rotary piston all the times. The rotary piston moves free of contact with the interior surface of the housing and this one seal member provides a seal for the joint created between the halves of the housing, the chambers of the housing as well as the actuating shaft. Movement of the piston is effected by air pressure and return motion of the piston can be air driven or spring assisted.

44 Claims, 12 Drawing Sheets

PNEUMATIC ACTUATOR

This application is a continuation-in-part of U.S. patent application Ser. No. 09/597,268, filed on Jun. 20, 2000 now abandoned, which had been a continuation of U.S. patent application Ser. No. 09/287,261, filed on Apr. 7, 1999, which had been a continuation of PCT/CA97/00736 filed Oct. 7, 1997, and this application is also a continuation of PCT/CA00/00373 filed Apr. 7, 2000.

FIELD OF INVENTION

The present invention is concerned with the field of valves and actuators and relates to a pneumatic actuator. More particularly, the present invention is an improved pneumatic actuator, which includes a rotary piston that reciprocates within a housing.

BACKGROUND OF INVENTION

FIG. 1 shows a conventional pneumatic valve actuator which includes a toothed shaft 10, an actuating shaft 20 extending through the toothed shaft 10, two piston members 30 each having a rack member 301 engaged with the toothed shaft 10, and a plurality of springs 302 biasedly disposed between an inner side of a housing 40 and the piston members 30. In operation, the pneumatic valve actuator operates on the basis of cycles of air movement. At the beginning of a cycle air under pressure enters the interior of the housing 100 via two holes 41 to push the piston members 30 from a starting position away from each other to a fully separated position (as illustrated in FIG. 1) such that the toothed shaft 10 is rotated in a counter-clockwise direction by the movement of the two rack members 301 and the springs 302 are thereby compressed. By virtue of the rotation of the toothed shaft the actuating shaft 20 is also rotated. The rotation of the actuating shaft 20 is utilized for some other function (not shown). When the piston members 30 reach the fully separated position air entry into the housing is stopped, and the two holes 41 are opened to vent the housing at which time, the springs 302 push the piston members 30 back to the original starting position and thereby the toothed shaft 10, and correspondingly, shaft 20 are rotated in a clock-wise direction. When the piston members reach the starting position, one cycle will have been completed. During operation, the force of pressurized air in the housing 100 causes leakage at the positions where the toothed shaft 10 and/or the actuating shaft 20 extend through the housing 40 (not shown in FIG. 1). Depending upon the construction characteristics and materials used in the valve, as well as the amount of pressure, even after using such actuators for a short period of time leakage can occur. Furthermore, the interior surfaces of the housing 40 and contact and sliding surfaces of the rack members 301 must be manufactured precisely to ensure that the rack members 301 slide smoothly along the inner surfaces of the housing 40 all of which increases the cost of manufacturing.

Another commonly used pneumatic valve actuator is illustrated in FIGS. 2 and 3. The actuator is disposed between a return spring 7400 and a valve 7200 with a shaft 6200 extending through the return spring, the actuator and the valve so that when pressurized air is injected into the actuator, the shaft is rotated to operate the valve.

The actuator includes a casing, including an upper casing 6010, a lower casing 6020 and a vane member 6400 which is received between the upper and lower casing. The upper and lower casing are connected by bolts 6030 along flanges extending from each of the upper and lower casing wherein the lower casing has two passages 6800 defined therein so that pressurized air can be injected from the air pump and into the passages. The shaft rotatably extends through the upper casing and the lower casing and securely extends through the vane member. A seal member 6600 is disposed to the vane member so that the piston member is reciprocally moved within the casing by pressurized air entering the casing through the passages. The shaft is co-rotated with the vane member so as to control the actuator between an open and closed position. A return spring means 7400 including a spring coil 7600 is disposed above the actuator casing in accordance with a requirement to automatically return the shaft to its starting position once the pressurized air is stopped, thereby returning the vane member to its original position.

The seal member tends to become quickly worn out because the seal member slides along an inner surface of the casing whenever the piston moves. Furthermore, the inner surface of each of the upper and lower casing must be machined smooth to prolong the life of the seal. The return means including the coil spring and the machining of the inner surface of the casing results in the whole assembly being quite expensive.

SUMMARY OF THE INVENTION

The present invention avoids the above-noted problems of the prior art by providing an improved pneumatic actuator comprising a simpler, cost efficient piston, spring, and seal assembly.

Accordingly, the present invention provides a pneumatic actuator comprising a housing having an inner surface, a piston having an exterior surface and disposed within the housing, a shaft connected to piston, and a seal simultaneously engaging each of the exterior surface of the piston, the inner surface of the housing, and the shaft, and defining first and second chambers within the housing. The first chamber can be substantially isolated from the second chamber. The seal can further include aperture means for receiving the shaft. The exterior surface of the piston can be movable relative to the seal. The seal can immovably reside in a groove formed within the inner surface of the housing. Movement of the piston from a static condition to an operative condition can be effected by fluid pressure. The actuator can further comprise resilient means for biasing the piston towards a static condition. The resilient means can have a first end and a second end, the first end engaging an inner surface of the housing within the second chamber, and the second end engaging the piston, and could include a leaf spring. The actuator can be operatively connected to a valve to effect movement thereof.

In another aspect, the present invention provides a pneumatic valve actuator comprising a housing, a piston, moveable between a stable condition and an operative condition, a seal for effecting sealing between the piston and the housing, and defining first and second chambers within the housing, and resilient means disposed within the housing for biasing the piston towards a static condition. The first chamber can be substantially isolated from the second chamber. The resilient means has a first end and a second end, the first end engaging an inner surface of the housing within the second chamber, and the second end engaging the piston. The actuator can be operatively connected to a valve to effect movement thereof.

In yet another aspect, the present invention provides a pneumatic actuator comprising a housing, a piston having an exterior surface, means to introduce fluid pressure into the housing to effect movement of the piston, and a seal for effecting sealing between the piston and the housing, and defining a first chamber and a second chamber within the housing, the seal engaging the exterior surface of the piston in a substantially fluid tight arrangement in response to fluid pressure in the first chamber. The seal can have a surface exposed to fluid pressure within the first chamber, the fluid pressure acting upon the surface to effect a substantially fluid-tight engagement between the seal and the exterior surface of the piston. The surface of the seal is other than perpendicular relative to an axis defined by the exterior surface of the piston. The actuator can be operatively connected to a valve to effect movement thereof.

In a further aspect, the present invention provides a pneumatic valve actuator comprising a housing, a rotary piston having at least a top, a bottom and a peripheral wall, sealing means, wherein the sealing means is cooperatively arranged with the housing and the piston such that the sealing means is in contact with the top, bottom and peripheral wall of the piston and the housing and thereby defines a first and second chamber within the housing, means for effecting movement of at least a portion of the piston from the first chamber into the second chamber and back into the first chamber, such movement comprising one cycle of the piston, means for transferring movement of the piston to a further device, wherein the housing is comprised of two halves and the sealing means is securely received in a groove which is formed upon joining the halves of the housing, the groove defines a loop on an inside wall of the housing where the halves join, the sealing means comprising a single loop of sealing material, and wherein the sealing material is selected from the group comprising Viton, Buna N™ or polyurethane.

According to a further aspect of the present invention there is a pneumatic valve actuator comprising a housing having a first half and a second half each half containing at least one passage defined therethrough and communicating with the interior and exterior of the housing, a groove defining a loop in an inner wall of the housing and formed when the halves are joined, a first and second hole defined perpendicularly through the housing, the first and second holes located in alignment with each other and communicating with the groove, a rotary piston having a top, a bottom, a peripheral wall connected between the top and the bottom, and at least one intermediate wall connected perpendicularly between the top, the bottom and the peripheral wall, and further having two engaging holes perpendicularly defined through the top and bottom, wherein the two engaging holes each are defined by a rectangular periphery and the actuating shaft has a rectangular cross section, a seal member securely received in the groove on the inner wall of the housing, two seal member holes defined through the seal member and located to communicate with the first hole and second hole wherein the sealing means is cooperatively arranged with the housing and the piston such that the sealing means is in contact with the exterior of the piston and the housing and thereby defines a first and second chamber within the housing, means for effecting movement of at least a portion of the piston from the first chamber into the second chamber and back into the first chamber, such movement comprising one cycle of the piston, an actuating shaft rotatably extending through the first hole, the two seal member holes, the two engaging holes and the second hole, wherein the rotary piston is fixedly connected to the actuating shaft, the actuating shaft imparting movement of the piston to a further device.

According to another aspect of the present invention, there is a pneumatic actuator comprising a housing having an inner surface, a piston having exterior and interior surfaces and disposed within the housing, the piston having a first position and a second position, whereby the piston is urged from the first position to the second position by fluid pressure, a shaft connected to the piston, and resilient spring having a first end and a second end, the first end abutting against the inner surface of the housing and the second end fixedly connected to the shaft, for urging the piston from the second position to the first position, wherein the first end comprises a roller disposed against the inner surface of the housing. The shaft includes lever arms for imparting kinetic energy from the piston to the spring means, the lever arms disposed against the interior surface of the piston. The shaft comprises a two-part construction, each part having a hub with a lever arm extending from the hub and each part rotatable about an axle. The axle is a two-part axle. The piston further includes opposing first and second interior surfaces having opposing first and second recesses respectively for retaining the two-part axle, and wherein each of the hubs includes throughbores for receiving the two-part axle therethrough. The two-part axle is spring-loaded by a spring means disposed between each part of the two-part axle for urging each part of the two-part axle against the first and second recesses.

According to a further aspect of the present invention there is a pneumatic actuator comprising a housing having an inner surface and defining a chamber, a piston having exterior and interior surfaces and disposed within the housing, the piston having a first position and a second position, whereby the piston is urged from the first position to the second position by fluid pressure, a shaft connected to the piston, a spring support member extending from the inner surface of the housing, resilient spring having a first end, and a second free end, the first end connected to the shaft, the second free end extending outwardly from the shaft and into the chamber, and the second free end being biassed against the spring support member. The first end of the resilient spring can be secured to the shaft.

Other advantages and novel features of the invention will become more apparent from the following detailed description when taken in conjunction with the accompanying drawings.

DETAILED DESCRIPTION OF THE INVENTION

Figure 4:
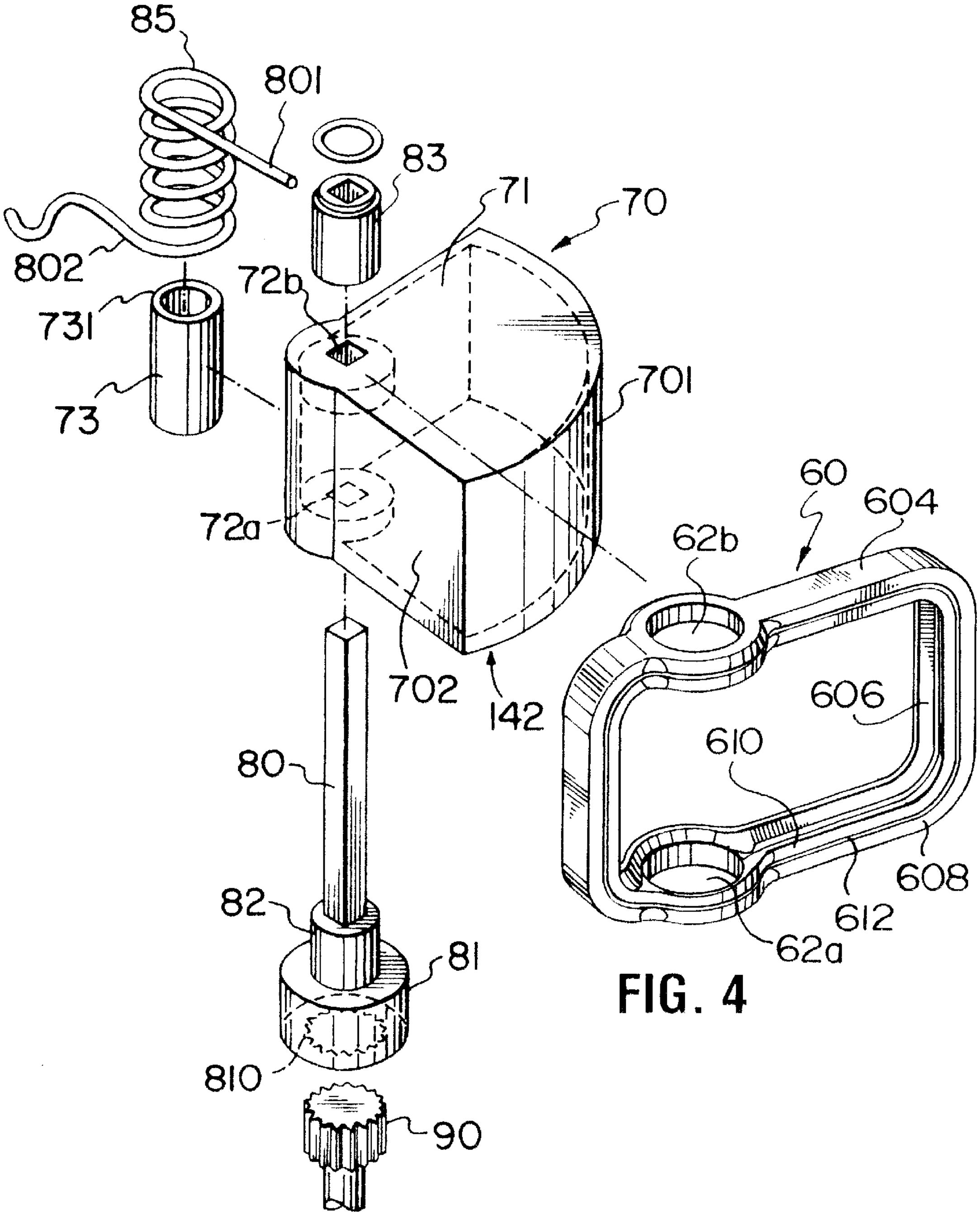
FIG. 4 is an exploded view of a pneumatic actuator in accordance with the present invention.
Figure 5:
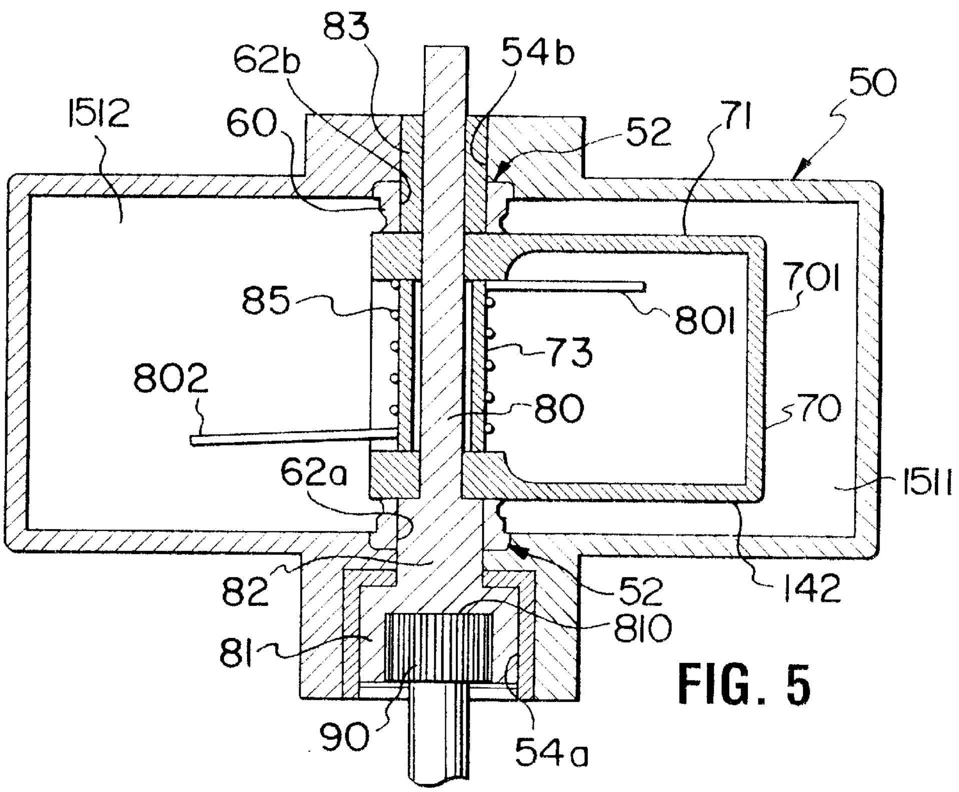
FIG. 5 is a side elevational view, partly in section, of a pneumatic actuator in accordance with the present invention.
Figure 6:
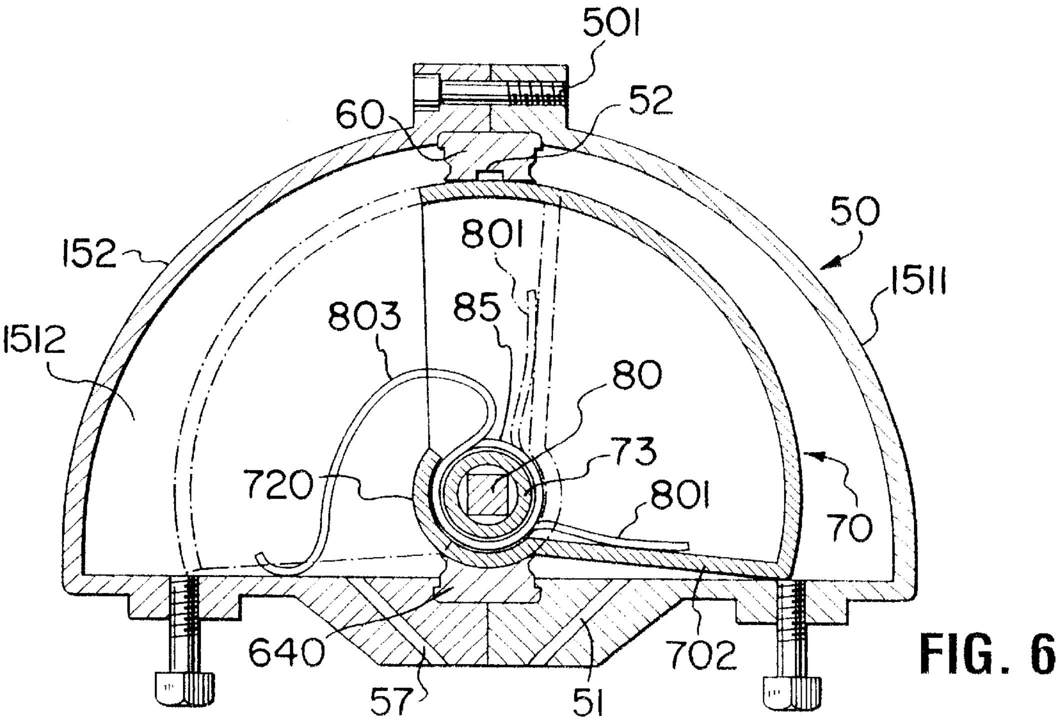
FIG. 6 is a top plan view, partly in section, of the pneumatic actuator to illustrate how the torsion spring works when the rotary piston is actuated.

Referring now to the drawings and initially to FIGS. 4 through 6, one embodiment of a pneumatic actuator according to the present invention comprises a housing 50, a rotary piston 70 and a seal 60.

The housing 50 is composed of two halves, first half 151 and second half 152, combined with fastening means 501 and has at least two airway passages 51, 57 (see FIGS. 6 and 7) defined therethrough which communicate between an interior 55 and exterior of the housing 50. A retaining groove 52 is defined on an inner side wall of the housing 50 to receive a seal 60 therein. The complete retaining groove is conveniently formed when the two halves of the housing 50 are fastened together by fastening means 501. When the first half 151 and the second half 152 are joined with piston 70 and seal 60 disposed therein, the housing 50 includes first chamber 1511 and second chamber 1512 which are substantially isolated from each other by piston 50 and seal 60.

The housing 50 further includes a first aperture 54*a* and a second aperture 54*b*, or two "holes", both of which pass through walls of the housing 50 and are located in alignment with each other to receive an actuating shaft 80 therethrough.

The seal 60 forms a band and is securely received, and immovably resides in the groove 52 and (see FIGS. 4, 5, 6 and 7) forms a complete loop around the interior side walls of the closed housing 50. The seal 60 can be made of any appropriate sealing material such as polyurethane, Viton™, or Buna N™. The placement of the seal 60 into the groove is conveniently achieved by fastening the two halves of the housing 50 together. A portion 602 of the seal 60 extends into the first chamber 1511 of the housing 50. This portion of the seal incorporates pressure assisted seal technology to ensure complete contact between the seal 60 and the exterior of the piston 70, as further described below. First and second apertures 62*a* and 62*b*, or two "holes", are defined through the seal 60 and located to communicate with the first housing aperture 54*a* and the second housing aperture 54*b* respectively.

The piston 70 has a top wall 71, a bottom wall 142, a peripheral wall 701 connected between the top wall 71 and the bottom wall 142, and an intermediate wall 702 joining the top wall 71, the bottom wall 142 and the peripheral wall 701. The piston can be open on one side such that the interior of housing 50 communicates with second chamber 1512 for facilitating the use of a biasing means to bias piston 70 to its static condition, as described below. The piston 70 receives an actuating shaft 80 through first aperture 72*a* and second aperture 72*b*, or two "engaging holes", provided in top wall 71 and bottom wall 142 respectively. Each of the first aperture 72*a* and second aperture 72*b* can have a rectangular periphery, although any shape which is capable of engaging an actuating shaft 80 of corresponding shape is within the scope of the present invention. The actuating shaft 80 has a first base portion 81 (see FIG. 4) having a splined sleeve 810 so as to receive a splined shaft 90 to which other mechanisms can be connected.

A cylindrical second base portion 82 extends axially from the first base portion 81, and the actuating shaft 80 extends axially from the second base portion 82. In one embodiment, the shaft 80 is rectangular although any shape corresponding to the shape of the first aperture 72*a* and second aperture 72*b* is within the scope of the present invention. When assembled, (see FIG. 5) the first base portion 81 is received within and provides seating for housing 50. The second base portion 82 extends through the first aperture 62*a* and provides seating for the exterior surface of piston 70. The actuating shaft 80 extends through the first piston aperture 72*a* and second piston aperture 72*b*, seal aperture 62*b*, and housing aperture 54*b*. Sleeve 83 is received in second housing aperture 54*b* and second seal aperture 62*b*, and is seated on the exterior surface of piston 70. Sleeve 83 receives shaft 80 and, therefore, spaces shaft 80 from the side walls of each of housing aperture 54*b* and seal aperture 62*b*.

Referring to FIG. 4, a tubular sleeve 73 having a passage 731 defined therethrough is mounted on the actuating shaft 80 and located between the top wall 71 and bottom wall 142 of the piston 70. In one embodiment, the passage 731 is defined by a tubular periphery. Referring to FIG. 5, when assembled, it can be seen that the rotary piston 70 rotates in unison with actuating shaft 80. According to one embodiment, a torsion spring 85 is mounted on the sleeve 73. The torsion spring 85 winds around sleeve 73 and has a first extending portion 801 thereof contacting against an inner surface of the intermediate wall 702. The torsion spring 85 further has a second extending portion 802, extending from piston 70 and contacting against an inner side of the housing 50 in second chamber 1512. First extending portion 801 is joined to second extending portion 802 by intermediate portion 803.

Referring now to FIGS. 4 and 6 it can be seen that an effective seal is created by the seal 60. Inner surface of seal 60 engages the exterior wall of piston 70 and outer surface 604 (FIG. 4) engages housing 50. More particularly, seal 60 contacts the top 71 and the bottom 142 of the piston 70 while the central portion 63 contacts the peripheral wall of the rotary piston 70. A portion of the seal 60 directly opposite the central portion (not shown in FIG. 4) is shown in cross-section in FIGS. 6 and 7 as 640 and this portion 640 is in contact with the extended wall portion 720 of intermediate wall 702. As well, the apertures in the seal 60 contact the piston where the shaft parts 82, 83 are located. In this respect, an effective seal is created between chambers 1511 and 1512. By virtue of this same arrangement, an effective seal is created between actuating shaft 80 and first chamber 1511, and between housing 50 and its external environment.

In summary, one seal provides all of the sealing necessary to provide two substantially isolated chambers 1511 and 1512.

As can be seen in FIG. 6, the contact between the seal member and the external surface of the piston 70 creates an effective seal and provides two chambers 1511 and 1512 thereby making it possible for air pressure to rise in chamber 1511 which provides a driving force for movement of the piston 70 into chamber 1512. As such, the exterior surface of piston 70 does not engage housing 50. Advantageously, the inner walls of the housing 50 do not need to be manufactured precisely and machined smooth because the rotary piston 70 does not contact the inner walls, only the seal. All that is required is that the walls of the piston 70 be smoothed, which from a manufacturing cost perspective is significantly easier to do and therefore significantly less costly.

Figure 10:
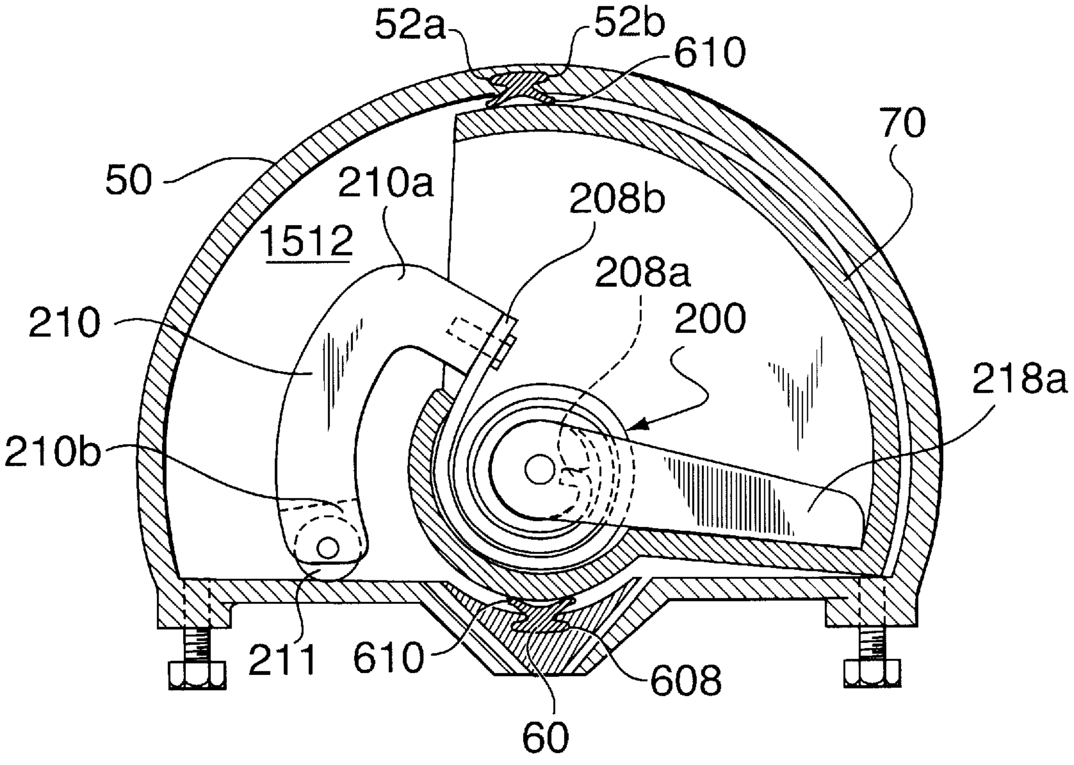
FIG. 10 is a top plan view, partly in section, of another embodiment of a pneumatic actuator of the present invention.
Figure 11:
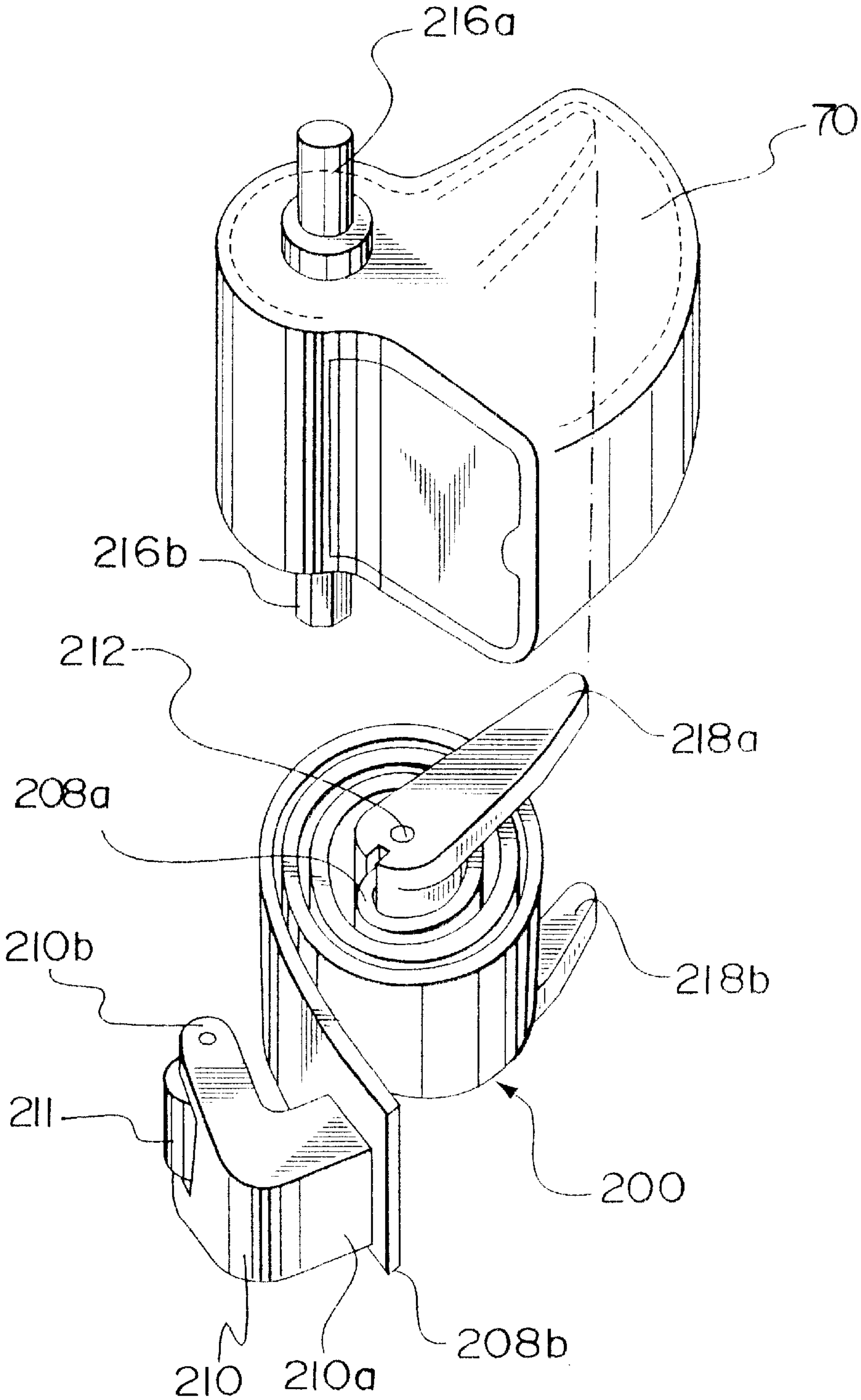
FIG. 11 is an exploded view of the piston assembly and the spring assembly of FIG. 9.

In another embodiment illustrated in FIGS. 9, 10 and 11, a spring 200 may be provided to bias piston 70 towards a static condition, such condition being further described below. A two-part hub 206, comprising upper and lower parts **206*a* and 206*b* is provided to fix one end 208*a* of spring 200. In this respect, each of upper and lower parts 206*a* and 206*b* include recesses 206*c* and 206*d* for receiving the first end 208*a* of spring 200. Each of upper and lower hub parts 206*a* and 206*b* rotate about spring-loaded two-part axle 212. Further, each of the hub parts 206*a* and 206*b* include bores extending therethrough for receiving each member of the two-part axle 212. Two-part axle 212 has upper and lower members 212*a* and 212*b* which are biased by spring 214 towards recesses 215*a* and 215*b* inside piston 70** and are retained therein.

The second end **208*b* of spring 200 is substantially fixed in space relative to housing 50 by armature 210 so that substantially all energy imparted to spring 200 is transferred to first end 208*a*. Armature 210 includes first and second ends 210*a* and 210*b*. First end 210*a* is coupled to second end 208*b* of spring 200. Second end 210*b* includes a roller 211 which is disposed against an inner wall of second chamber 1512 of housing 50 for reducing friction load as armature 210 moves in response to a reduction in diameter of the spring 200 as spring 200** is placed under tension.

To impart kinetic energy from piston 70 to the spring 200, upper and lower drive arms **218*a* and 218*b* are coupled to upper and lower hub parts 206*a* and 206*b* respectively. Each of upper and lower drive arms 218*a* and 218*b* are disposed against inner walls of piston 70. As piston 70 rotates, kinetic energy is imparted to each of drive arms 218*a* and 218*b*, which consequently transfers kinetic energy to hub parts 206*a* and 206*b*, whereby kinetic energy is finally transmitted to the first end 208*a* of spring 200**.

Figure 9:
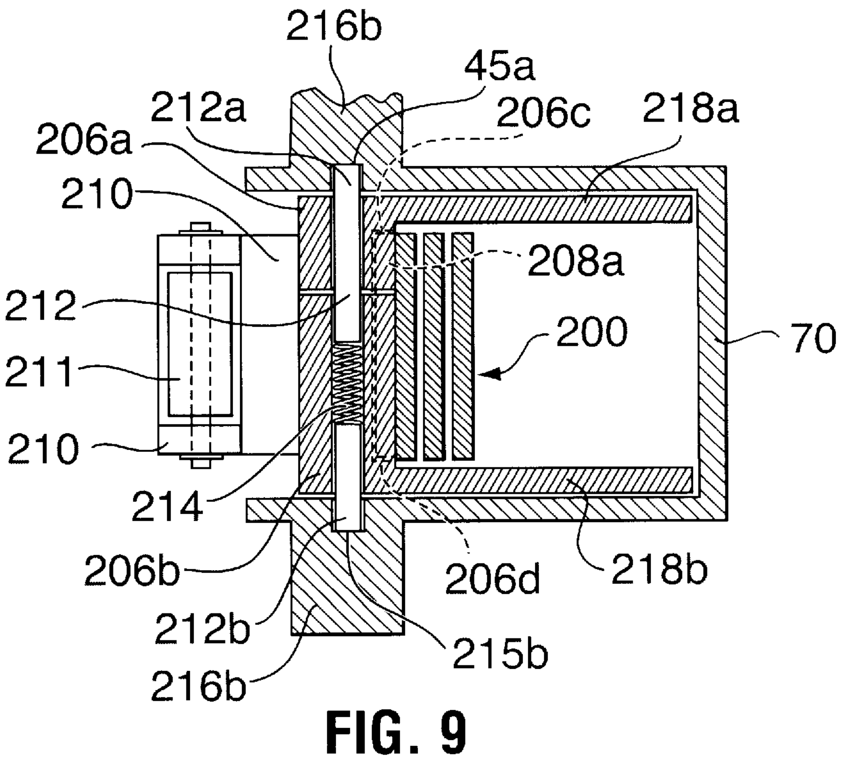
FIG. 9 is a side elevation view, partly in section, of the piston assembly and spring assembly of the actuator in FIG. 10.

In the embodiment illustrated in FIG. 9, stub shafts **216*a* and 216*b* are integrated with piston 70. In turn, devices can be operatively connected to either of stub shaft 216*a* or 216*b***, to thereby be actuated by the actuator of the present invention.

In another embodiment illustrated in FIGS. 13–16, a pneumatic actuator is shown also having a two-part coil spring 400 for biasing piston 70 towards a static condition. Coil spring 400 includes an upper spring part **400*a* and a lower spring part 400*b*. In association with each upper and lower spring parts 400*a* and 400*b*, a pair of two-part bushings 406*a* and 406*b* is provided for spacing spring parts 400*a* and 400*b* from each other and from the inner wall of piston 70. In this respect, upper and lower parts 406*a* and 406*b* include slots 406*c* and 406*d* for receiving the first end 408*a* of the spring part 400*a* or 400*b*. The first end 408*a* extends through slots 406*c* or 406*d* and is keyed to shaft 80 within groove 81 formed therein. In this respect, inner portion of spring parts 400*a* and 400*b* rotate with shaft 80**.

Shaft 80 extends through opposing and aligned throughbores **54*a* and 54*b* formed in piston 70. Retaining clips 420 and 422 are provided to prevent axial movement of shaft 80 to piston 70. Retaining clips 420 and 422 are fitted upon corresponding shoulders formed on the surface of shaft 80. When fitted on their corresponding shoulders, retaining clips 420 and 422 extend outwardly from the shoulders and are interposed between flanges 424 and 426, provided on respective bushings 406*a* and 406*b*, and inner wall portions 428 and 430 of piston 70 proximate respective throughbores 54*a* and 54*b*. In this respect, retaining clips 420 and 422, acting in concert, substantially prevents axial movement of shaft 80 relative to piston 70. Shaft 80 can further be operatively connected to a valve stem 432**.

The second outer end **408*b* of each of spring parts 400*a* and 400*b* extends outwardly from shaft 80 and into chamber 1512, where it is freely supported by spring support member 410. Spring support member 410 is mounted on and extends from an inner wall of chamber 1512. Spring support member 410 has a distal end 412 having a surface comprising an antifriction sleeve. Distal end 412 has a first side surface 414 and a second side surface 416, both extending from an inner wall of chamber 1512 connecting to distal end 412. Each of spring parts 400*a* and 400*b* proximate their respective second outer ends 408*b* is biased against distal end 412 of spring support member 410. Ends 408*b* are configured to move radially relative to the spring support member 410. In the embodiment illustrated in FIG. 13, distal end 412 is rounded to minimize frictional losses when spring parts 400*a* and 400*b* move across the surface of distal end 412 in response to rotation of piston 70. Spring parts 400*a* and 400*b* proximate second outer ends 408*b* move across the surface of distal end 412 in response to rotation of shaft 80. Second outer ends 408*b* are bent for facilitating installation of respective spring parts 400*a* and 400*b***.

Figure 12:
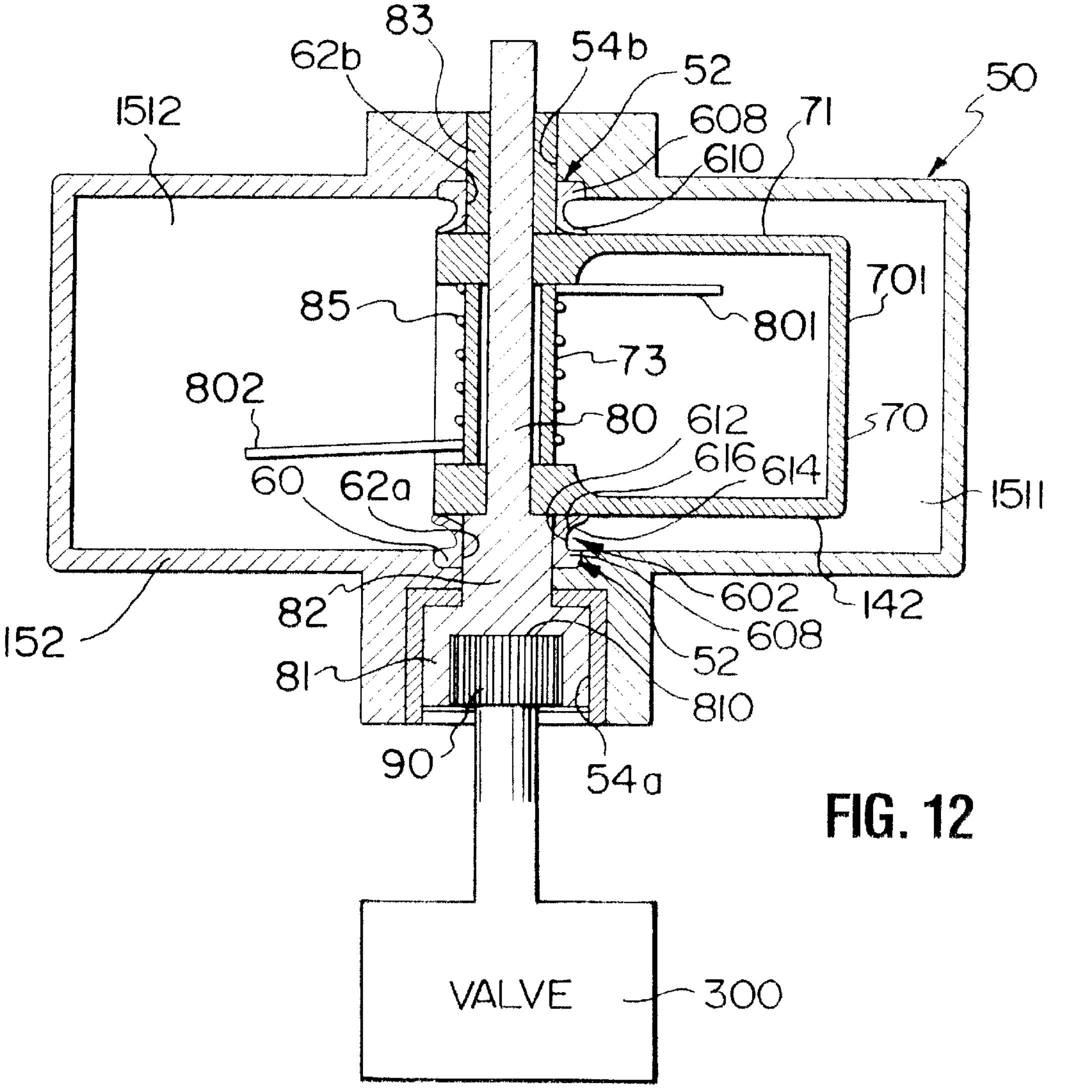
FIG. 12 is a side elevation view, partly in section, of a valve which is operatively connected to an embodiment of a pneumatic actuator of the present invention.
Figure 13:
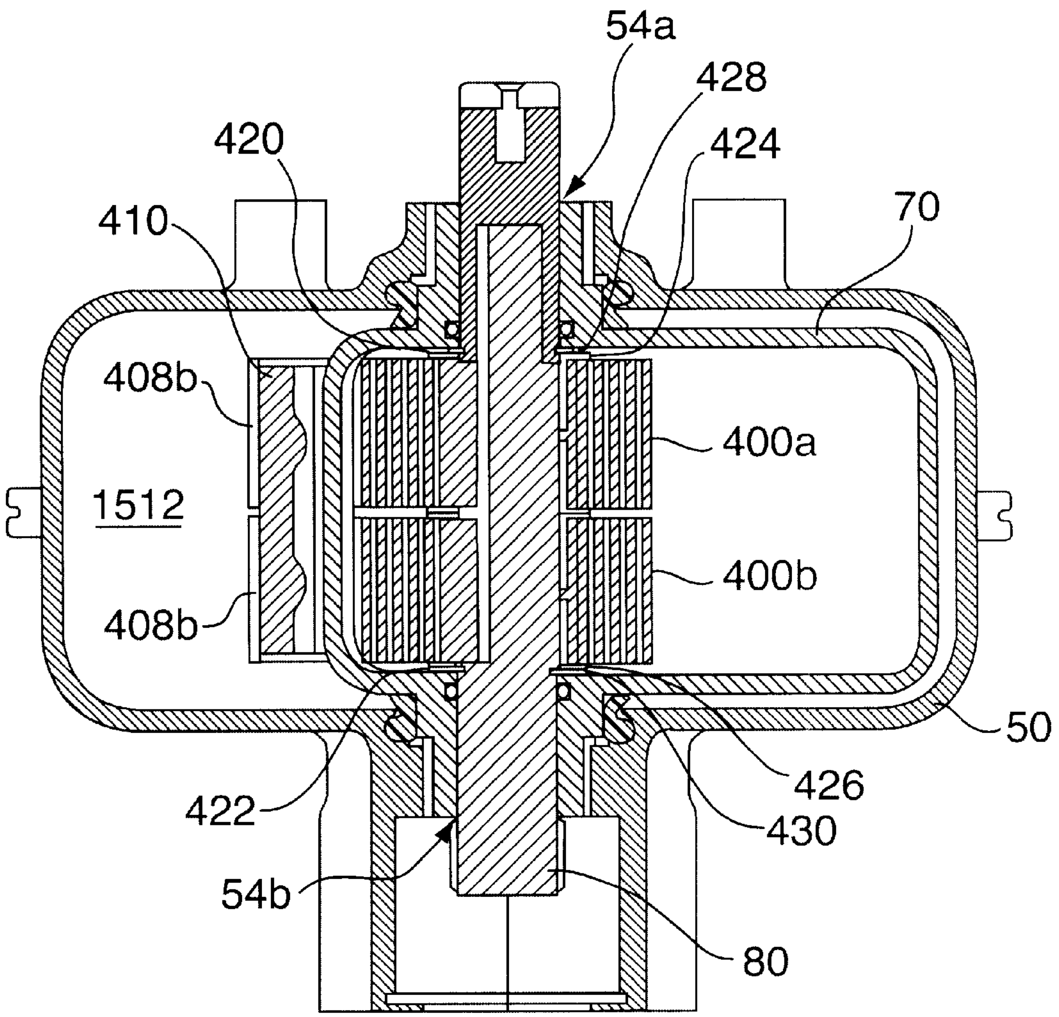
FIG. 13 is a top plan view, partly in section, of another embodiment of a pneumatic actuator of the present invention.
Figure 14:
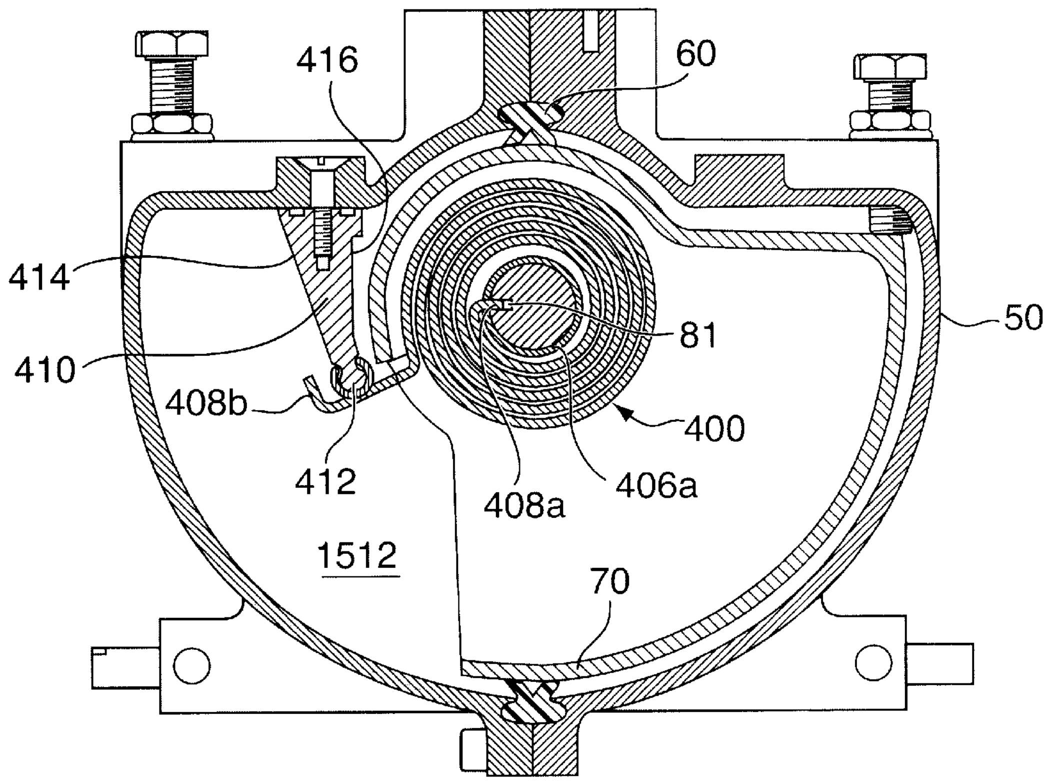
FIG. 14 is a side elevation view, partly in section, of the embodiment illustrated in FIG. 13.
Figure 15:
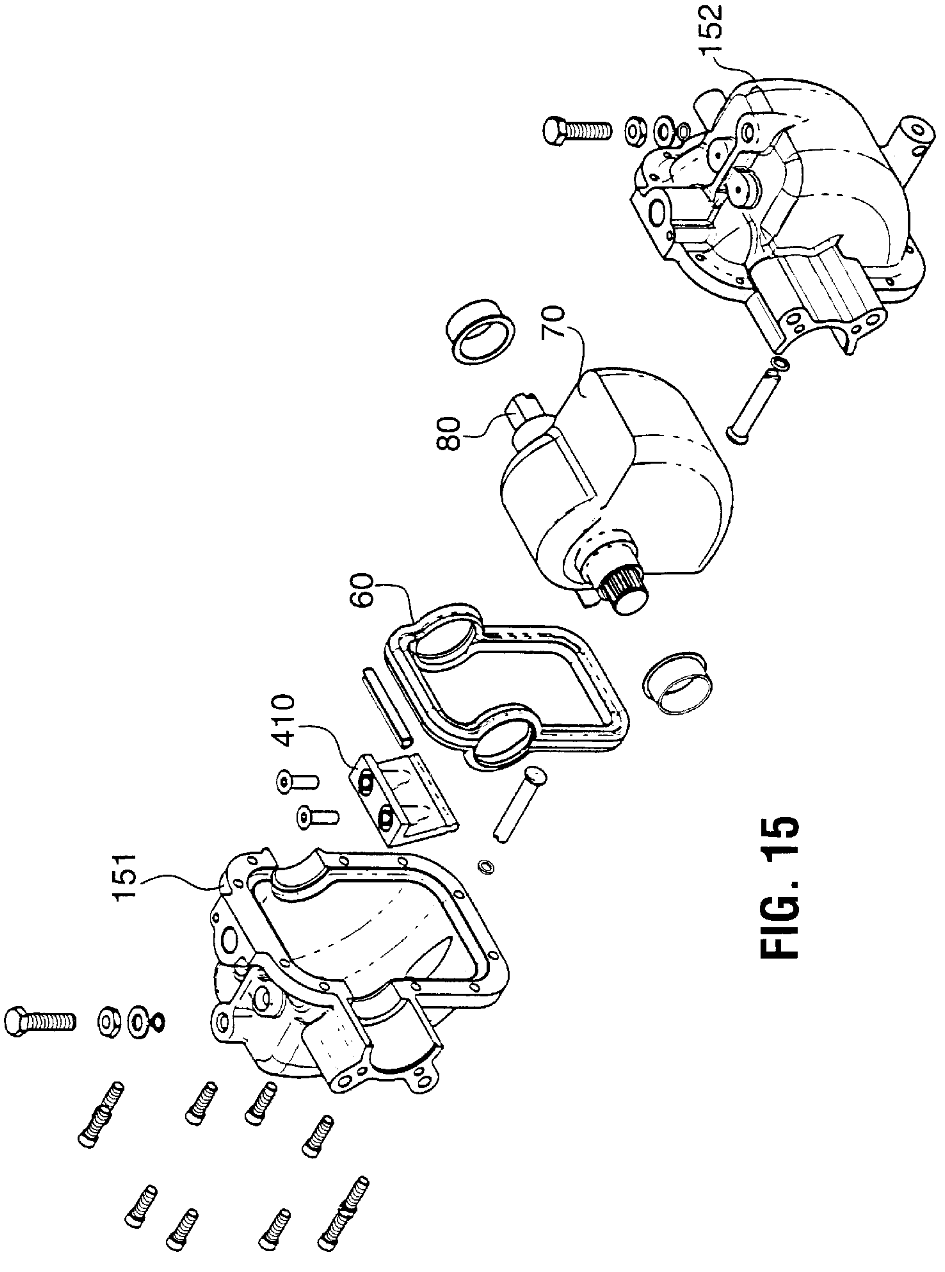
FIG. 15 is an exploded view of the housing piston assembly, and seal of the embodiment illustrated in FIG. 13.
Figure 16:
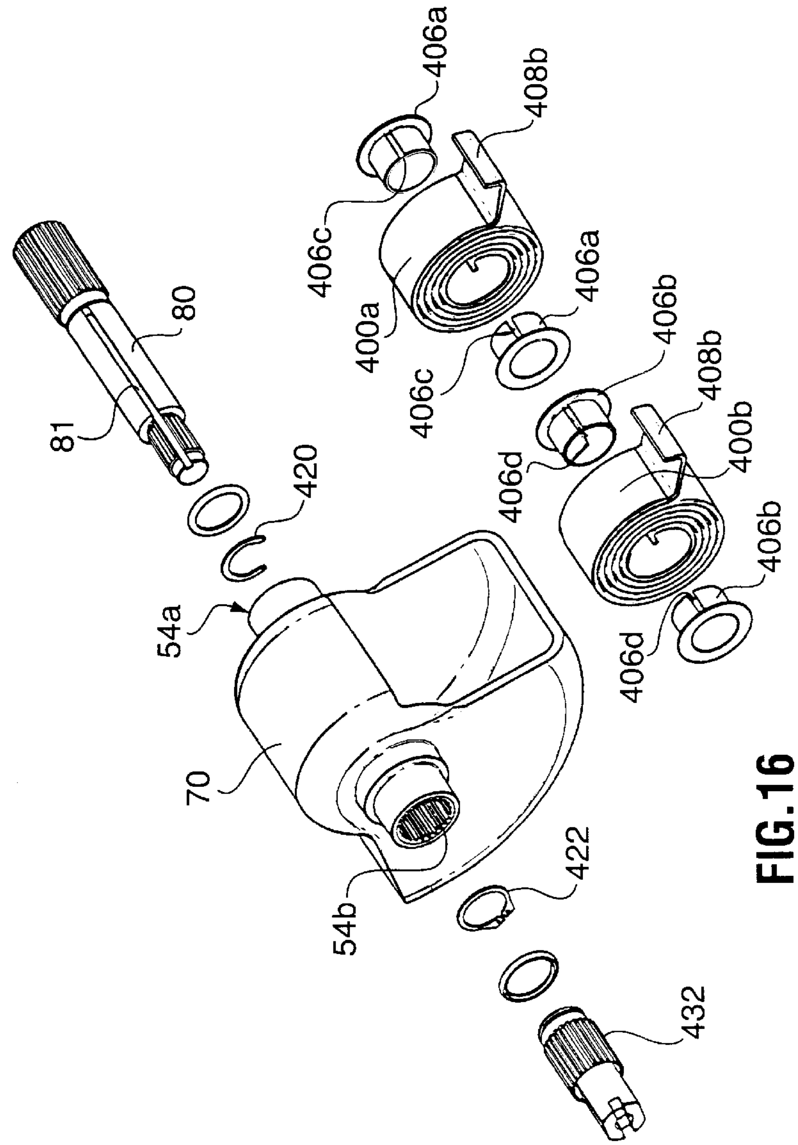
FIG. 16 is an exploded view of the piston assembly and the spring assembly of the embodiment illustrated in FIG. 13.

Referring to FIG. 12, an embodiment of the pneumatic actuator may be operatively connected to a valve 300 for effecting movement of valve 300 between static and operating conditions. In this respect, shaft 80, which is engaged to piston 70, can include a splined sleeve 81 for receiving a spline shaft 90 which is coupled to valve 300. Rotation of piston 70, therefore, effects movement of valve 300. It is understood to those skilled in the art that any other conventional means by which the movement of the piston 70 can be transferred to a further device is within the scope of the present invention.

The sealing arrangement will now be explained with reference to FIGS. 4, 10, and 12. The seal 60 comprises a continuous band having an outer surface 604 and an inner surface 606. The outer surface 604 engages housing 50. In this respect, an outer retaining ring 608 extends radially from and coextensively with the outer surface 604, and is keyed or anchored within groove 52 of housing 50. In this respect, groove 52 acts as a keyway having opposing locking shoulders **52*a* and 52*b* for locking or anchoring the outer retaining ring 608 within the keyway or groove 52. The inner surface 606 engages piston 70. In this respect, portion 602 has an inner retaining ring 610 extending radially from and coextensively with the inner surface 606, and projecting into the first chamber 1511. The outer retaining ring 608 is joined to the inner retaining ring 610 by web 612. The inner retaining ring 610 has an outer surface 614 and an inner surface 616. The inner surface 616 engages the exterior surface of piston 70. The outer surface 614 faces first chamber 1511 and is disposed such that outer surface 614 is not perpendicular to an axis defined by the exterior of piston 70. In this respect, any fluid in chamber 1511 will tend to exert forces on outer surface 614 such that a substantially fluid tight seal is formed between inner surface 616 and the exterior of piston 70**.

Figure 1:
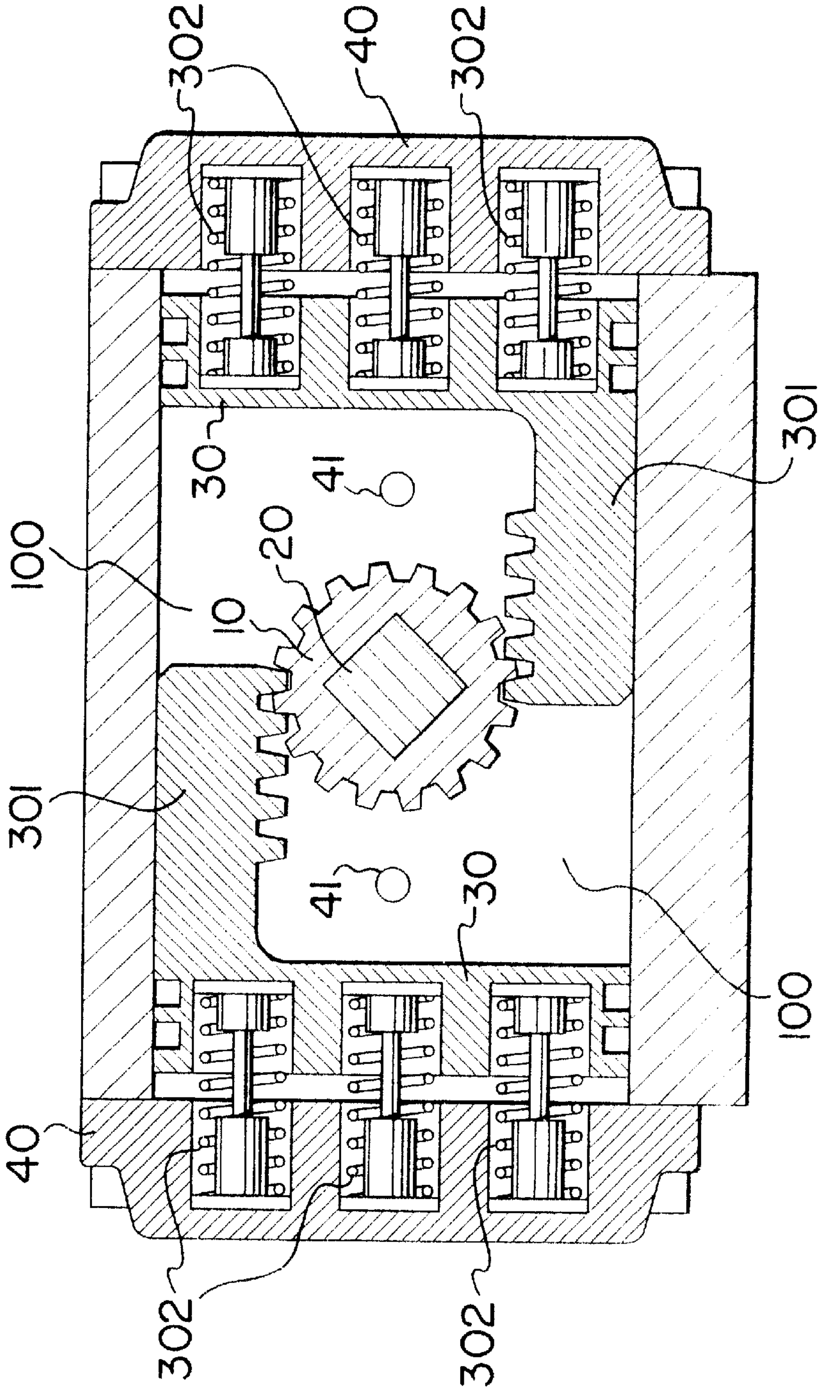
FIG. 1 PRIOR ART
FIG. 1 is a top plan view, partly in section, of a conventional pneumatic actuator.
Figure 2:
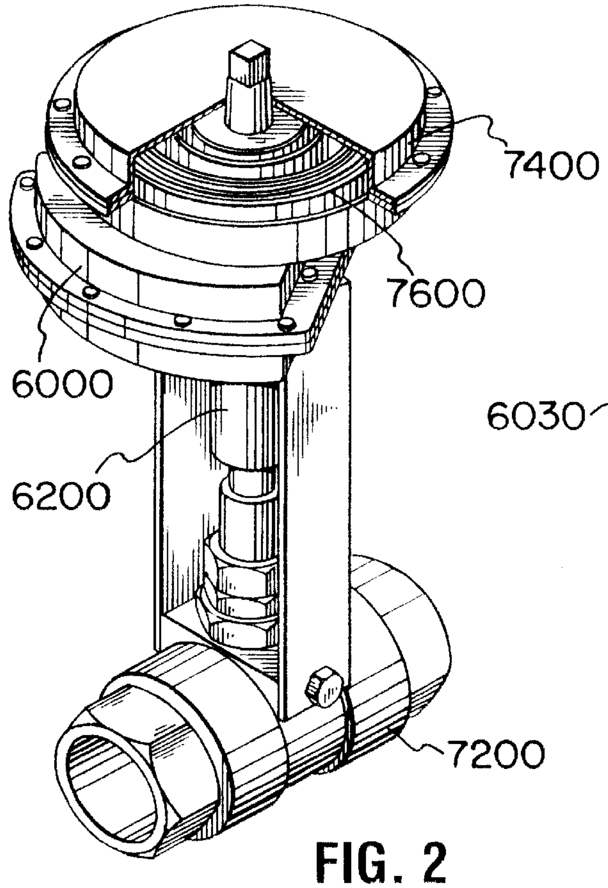
FIG. 2 PRIOR ART
FIG. 2 is a perspective view of a pneumatic actuator comprising a conventional control means and a spring return.
Figure 3:
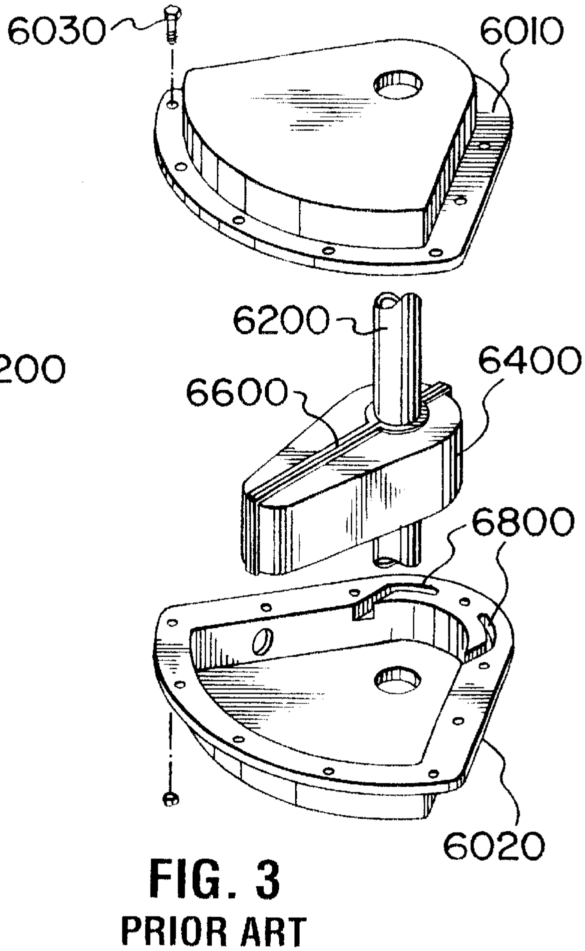
FIG. 3 PRIOR ART
FIG. 3 is an exploded view of the pneumatic actuator of FIG. 2.

In one embodiment, the piston 70 can be constructed to provide biasing means for biasing the piston 70 towards a static condition and in the general direction of first chamber 1511. Unlike the elaborate external return means of the prior art illustrated in FIGS. 2 and 3, or a multiplicity of linear coil springs as illustrated in the prior art of FIG. 1 , the torsion spring 85 can be designed to be installed inside the piston 70. After adding one revolution (clockwise) of preload, the helical portion of the torsion spring 85 (see FIG. 6) will relax against an extended wall portion 720 of the piston 70 making the assembly safe for handling while it is being installed between the two halves of the housing 50. As the housing halves are tightened together the helical portion will be forced clockwise about another 30 degrees adding more preload. This now removes the arm 802 from contact with the extended portion 720, of the piston 70.

In operation, a complete cycle of the piston 70 starts when pressurized air is allowed into the housing 50 through passage 51 (passage 57 is open to atmospheric or reduced pressure) into first chamber 1511. By virtue of the air pressure, the rotary piston 70 rotates from a static starting position to an actuated midcycle position as shown by phantom lines in FIG. 6. The rotary piston 70 completes the cycle upon release of air pressure into chamber 1511 by rotation back to the static starting position condition as shown by solid lines in FIG. 4 by virtue of the energy stored in the torsion spring 85. This rotation is transferred to any external device connected to the rotary shaft 80.

Figure 7:
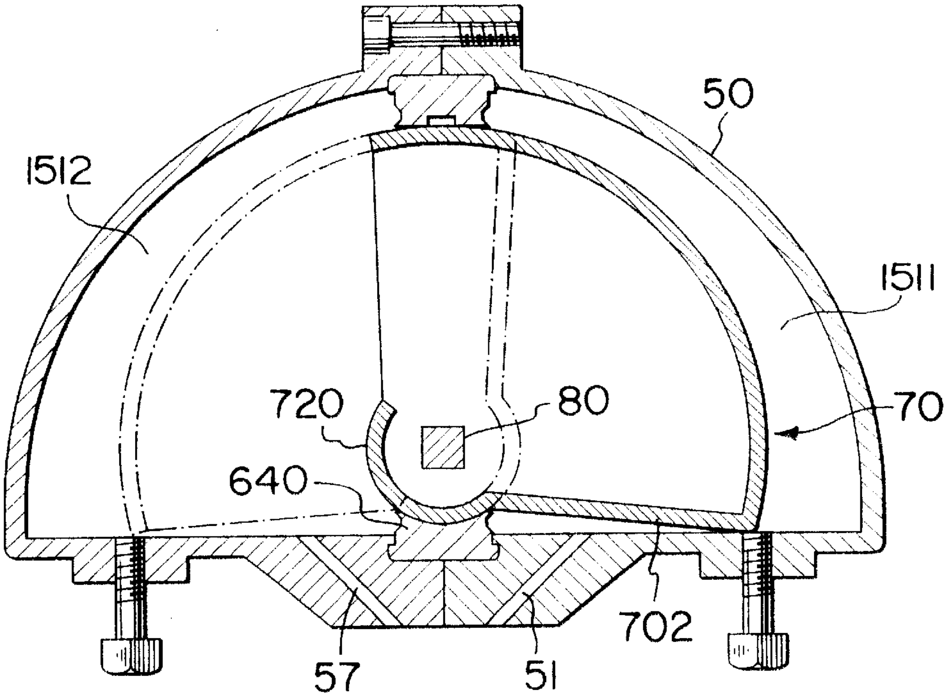
FIG. 7 is a top plan view, partly in section, of another embodiment of the pneumatic actuator to show the rotary piston is actuated by air-flow without the torsion spring.

FIG. 7 shows another embodiment of an actuator valve of the present invention which differs from the embodiment in FIG. 6 by the absence of a torsion spring. In operation, a complete cycle of the piston 70 starts when pressurized air is allowed into the housing 50 through passage 51 (passage 57 is open to atmospheric or reduced pressure) in the first chamber 1511. By virtue of the air pressure in chamber 1511, the rotary piston 70 rotates from a static starting position to an actuated midcycle position as shown by phantom lines in FIG. 7. The rotary piston 70 completes the cycle by rotation back to the starting position as shown by solid lines in FIG. 7 by virtue of the introduction of pressurized air via passage 57 (passage 51 is open to atmospheric or reduced pressure) into second chamber 1512.

Figure 8:
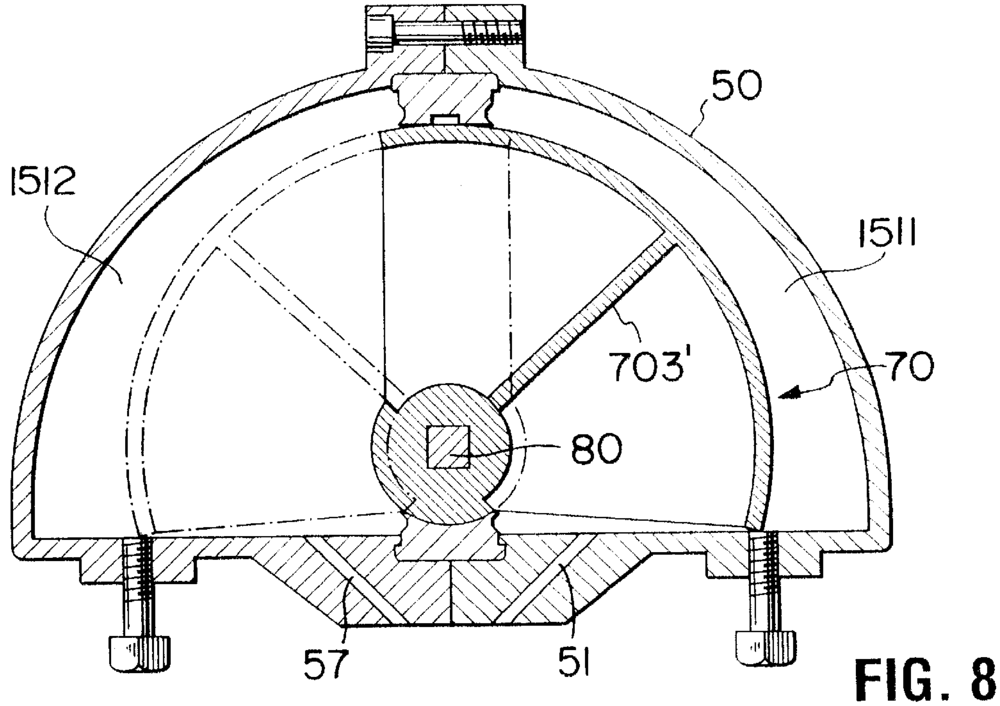
FIG. 8 is a top plan view, partly in section, of another embodiment of the pneumatic actuator to show the rotary piston is actuated by air-flow without the torsion spring.

FIG. 8 shows a further embodiment of an actuator of the present invention. As in the embodiment shown in FIG. 7, there is no torsion spring. In this embodiment, however, intermediate wall 702 is disposed such that it contacts an intermediate part of the peripheral wall 701 of the piston 70. The arrangement of this intermediate wall is such that in operation, a complete cycle of the piston 70 starts when pressurized air is allowed into the first chamber 1511 of the housing 50 through passage 51 (passage 57 is open to atmospheric or reduced pressure) and by virtue of the air pressure the rotary piston 70 rotates from a static starting position to a midcycle position as shown by phantom lines in FIG. 8 The rotary piston 70 completes the cycle by rotation back to the starting position as shown by solid lines in FIG. 8 by virtue of the introduction of pressurized air via passage 57 (passage 51 is open to atmospheric or reduced pressure) into second chamber 1512.

Although the invention has been explained in relation to its preferred embodiment, it is to be understood that many other possible modifications and variations can be made without departing from the spirit and scope of the invention as hereinafter claimed.

I claim:

1. A pneumatic rotary actuator comprising:

a housing including an inner surface;

a rotary piston disposed within said housing, said piston characterized by a first position and a second position, whereby said piston is urged from said first position to said second position by fluid pressure;

a shaft connected to said piston; and resilient spring including a first end and a second end, said first end coupled to an armature, said armature including a roller disposed against said inner surface of said housing, said second end fixedly connected to said shaft, whereby said spring urges said piston from said second position to said first position.

2. The actuator of claim 1 wherein said shaft includes lever arms for imparting kinetic energy from said piston to said spring means, said lever arms disposed against said interior surface of said piston.

3. The actuator of claim 2 wherein said shaft comprises a two-part construction, each part having a hub with a lever arm extending from said hub and each part rotatable about an axle.

4. The actuator of claim 3 wherein said axle is a two-part axle.

5. The actuator of claim 4 wherein said piston further includes opposing first and second interior surfaces having opposing first and second recesses respectively for retaining said two-part axle, and wherein each of said hubs includes throughbores for receiving said two-part axle therethrough.

6. The actuator of claim 5 wherein said two-part axle is spring-loaded by a spring means disposed between each part of said two-part axle for urging each part of said two-part axle against said first and second recesses.

7. A pneumatic rotary actuator comprising:

a housing including an inner surface and defining a chamber;

a rotary piston disposed within said housing, said piston characterized by a first position and a second position, whereby said piston is urged from said first position to said second position by fluid pressure;

a shaft connected to said piston;

a resilient spring including a first end and a second free end, said first end connected to said shaft, said second free end extending outwardly from said shaft and into said chamber; and a spring support member extending from said inner surface of said housing and including a distal end configured to support the resilient spring;

wherein said second free end is biased against said distal end and is configured to move radially relative to said spring support member.

8. The actuator of claim 7 wherein an antifriction sleeve is mounted on said distal end, and wherein the spring is disposed against said antifriction sleeve.

9. The actuator of claim 8 wherein said distal end is rounded.

10. The actuator of claim 8 or 9 wherein said shaft includes lever arms for imparting kinetic energy from said piston to said spring means, said lever arms disposed against said interior surface of said piston.

11. The actuator of claim 10 wherein said shaft comprises a two-part construction, each part having a hub with a lever arm extending from said hub and each part rotatable about an axle.

12. The actuator of claim 11 wherein said axle is a two-part axle.

13. The actuator of claim 12 wherein said piston further includes opposing first and second interior surfaces having opposing first and second recesses respectively for retaining said two-part axle, and wherein each of said hubs includes throughbores for receiving said two-part axle therethrough.

14. The actuator of claim 13 wherein said two-part axle is spring-loaded by a spring means disposed between each part of said two-part axle for urging each part of said two-part axle against said first and second recesses.

15. A pneumatic actuator comprising:

a housing having an inner wall and a groove, said groove being recessed into said inner wall;

a rotary piston having an exterior surface and disposed within said housing;

a shaft connected to said piston; and a seal simultaneously engaging each of said exterior surface of said piston, said inner surface of said housing, and said shaft, and defining first and second chambers within said housing, said seal being disposed within said groove.

16. The actuator of claim 15 wherein said first chamber is substantially isolated from said second chamber.

17. The actuator of claim 16 wherein said seal further includes aperture means for receiving said shaft.

18. A pneumatic actuator comprising:

a housing having an inner surface;

a rotary piston having exterior and interior surfaces and being disposed within said housing, said piston having a first position and a second position, whereby said piston is urged from said first position to said second position by fluid pressure;

a shaft connected to said piston;

spring means having a first end and a second end, said first end abutting against said inner surface of said housing and said second end fixedly connected to said shaft, for urging said piston from said second position to said first position wherein said first end comprises a roller disposed against said inner surface of said housing.

19. The actuator of claim 18 wherein said shaft includes lever arms for imparting kinetic energy from said piston to said spring means, said lever arms being disposed against said interior surface of said piston.

20. The actuator of claim 19 wherein said shaft comprises a two-part construction, each part having a hub with a lever arm extending from said hub and each part being rotatable about an axle.

21. The actuator of claim 20 wherein said axle is a two-part axle.

22. The actuator of claim 21 wherein said piston further includes opposing first and second interior surfaces having opposing first and second recesses respectively for retaining said two-part axle, and wherein each of said hubs includes throughbores for receiving said two-part axle therethrough.

23. The actuator of claim 22 wherein said two-part axle is spring-loaded by a spring disposed between each part of said two-part axle for urging each part of said two-part axle against said first and second recesses.

24. A pneumatic actuator comprising:

a housing having an inner wall and a groove, said groove being recessed into said inner wall;

a rotary piston having an exterior surface and being disposed within said housing;

a shaft having a perimeter and extending from said exterior surface of said piston for imparting movement to a further device;

a means to introduce fluid pressure into said housing to effect movement of said piston; and a seal, disposed within said housing, simultaneously engaging each of said exterior surfaces of said piston, said inner surface of said housing, and said shaft, and for effecting sealing between: (i) said piston and said housing, and (ii) said shaft and said housing, and thereby defining a first chamber and a second chamber, wherein said seal is securely restrained in said groove.

25. The actuator of claim 24 wherein said seal includes an aperture for receiving said shaft therethrough and engaging said shaft about said perimeter.

26. The actuator of claim 25 wherein said seal further includes a first end engaging said exterior surface of said piston and a second opposite end secured by said groove, such that said seal undergoes elastic deformation in a direction substantially perpendicular to said exterior surface of said piston in response to fluid forces acting on said seal remote from said second end.

27. The actuator of claim 26 wherein said second end if frictionally restrained from escaping said groove.

28. The actuator of claim 27 wherein a portion of said groove is defined by a shoulder and wherein said seal seats on said shoulder.

29. The actuator of claim 28 wherein said groove comprises:

a first portion defined by sidewalls and being recessed into said inner wall in a substantially perpendicular direction relative to said inner wall; and first and second appendages defined by sidewalls extending in opposite directions from said first portion and in a substantially perpendicular direction relative to said first portion;

and wherein said second end of said seal resides within said first portion and said first and second appendages.

30. The actuator of claim 29 wherein said first end has a surface exposed to fluid pressure within said first chamber, said fluid pressure acting upon said surface to effect substantially fluid tight engagement between said seal and said exterior surface of said piston.

31. The actuator of claim 30 wherein said surface of said first end of said seal is other than perpendicular, relative to an axis defined by said exterior surface of said piston.

32. A valve operatively connected to the actuator of claim 24.

33. A housing having an inner wall and a groove defining a keyway, said groove being recessed into said inner wall;

a rotary piston having an exterior surface and being disposed within said housing; and a seal including an outer sealing ring and an inner sealing ring, said outer sealing ring being keyed, locked, or anchored into said keyway, and said inner sealing ring engaging said exterior surface of said piston.

34. The actuator of claim 33, wherein said seal further includes a first end engaging said exterior surface of said piston and a second opposite end secured by said groove, such that said seal undergoes elastic deformation in a direction substantially perpendicular to said exterior surface of said piston in response to fluid forces acting on said seal remote from said second end.

35. The actuator of claim 34, wherein said second end is frictionally restrained from escaping said groove.

36. The actuator of claim 35, wherein a portion of said grove is defined by a shoulder and wherein said seal seats on said shoulder.

37. The actuator of claim 36, wherein said groove comprises:

a first portion defined by sidewalls and being recessed into said inner wall in a substantially perpendicular direction relative to said inner wall; and first and second appendages defined by sidewalls extending in opposite directions from said first portion and in a substantially perpendicular direction relative to said first portion;

and wherein said second end of said seal resides within said first portion and said first and second appendages.

38. The actuator of claim 37, wherein said first end has a surface exposed to fluid pressure, said fluid pressure acting upon said surface to effect substantially fluid tight engagement between said seal and said exterior surface of said piston.

39. The actuator of claim 38, wherein said surface of said first end of said seal is other than perpendicular relative to an axis defined by said exterior surface of said piston.

40. The pneumatic actuator as claimed in claim 33 wherein said outer sealing ring is keyed into said keyway.

41. The pneumatic actuator as claimed in claim 33 wherein said outer sealing ring is locked into said keyway.

42. The pneumatic actuator as claimed in claim 33 wherein said outer sealing ring is anchored into said keyway.

43. The pneumatic actuator as claimed in claim 33 wherein said keyway includes opposing locking shoulders for securing said outer sealing ring therein.

44. The pneumatic actuator as claimed in claim 43 wherein said inner sealing ring presents an outer surface which is oriented in a direction other than normal to the axis of the exterior of the piston.

* * * * *